United States Patent [19]

Shiraishi et al.

[11] Patent Number: 4,607,456

[45] Date of Patent: Aug. 26, 1986

[54] DOOR WINDOW REGULATOR

[75] Inventors: Daiichi Shiraishi; Eiji Iwasaki; Ryoichi Fukumoto, all of Aichi, Japan

[73] Assignees: Toyota Jidosha Kabushiki Kaisha; Aisin Seiki Co., Ltd., both of Japan

[21] Appl. No.: 741,618

[22] Filed: Jun. 5, 1985

[30] Foreign Application Priority Data

Jun. 6, 1984 [JP] Japan ................................. 59-83808
Jun. 6, 1984 [JP] Japan ................................. 59-83809

[51] Int. Cl.⁴ ............................................. E05F 11/48
[52] U.S. Cl. ........................................ 49/352; 49/360
[58] Field of Search ................................. 49/352, 360

[56] References Cited

U.S. PATENT DOCUMENTS 3,014,716 12/1961 Hitzelberger ..................... 49/352 X
4,468,887 9/1984 Koch ..................................... 49/352

FOREIGN PATENT DOCUMENTS 3108557 2/1982 Fed. Rep. of Germany .
41996 6/1980 Japan .
161173 12/1980 Japan .

Primary Examiner—Philip C. Kannan
Attorney, Agent, or Firm—Finnegan, Henderson, Farabow, Garrett & Dunner

[57] ABSTRACT

A door window regulator for vertically moving a door window glass of a vehicle includes a guide member which guides the vertical movement of the door window glass. A wire is stretched between pulleys respectively provided at the upper and lower portions of the guide member and is connected to the lower portion of the window glass, whereby the window glass is vertically moved by the driving force transmitted from a driving unit. The axis of either one of the pulleys extends in the direction substantially orthogonal to the plane which includes the portion of the wire which extends from that pulley to the driving unit and is directed toward the inside of the compartment of the vehicle, whereby the condition in which the wire is passed over the pulley is maintained in an appropriate state at all times.

20 Claims, 44 Drawing Figures

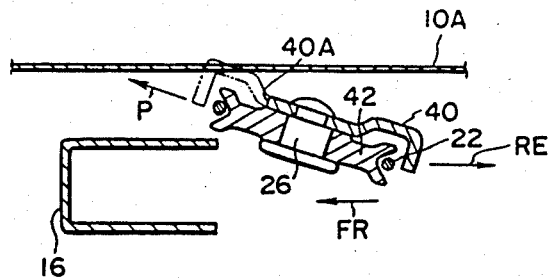
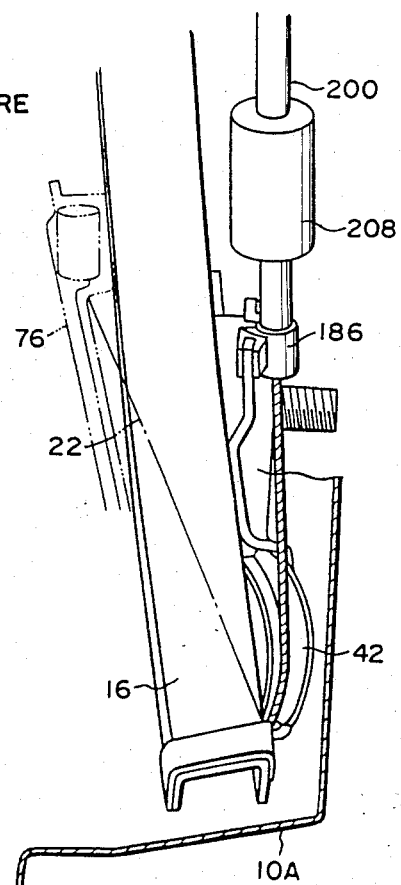
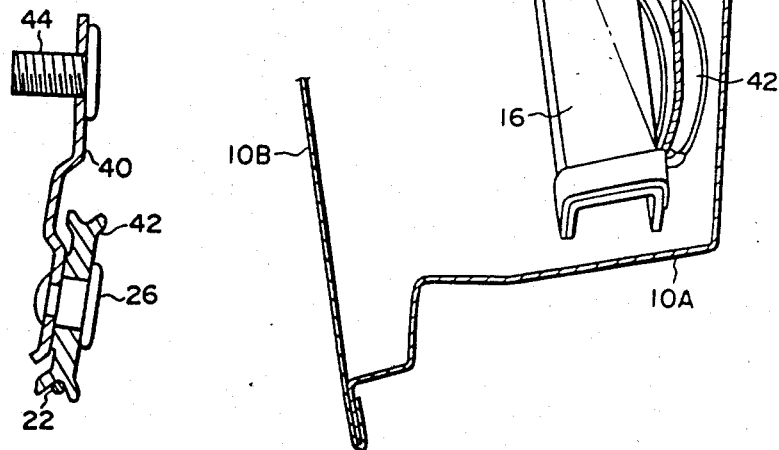

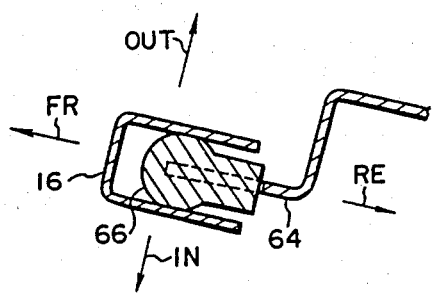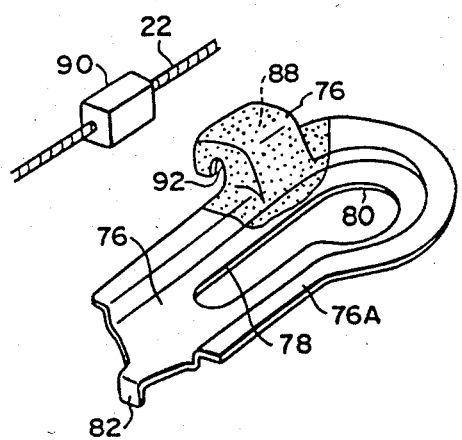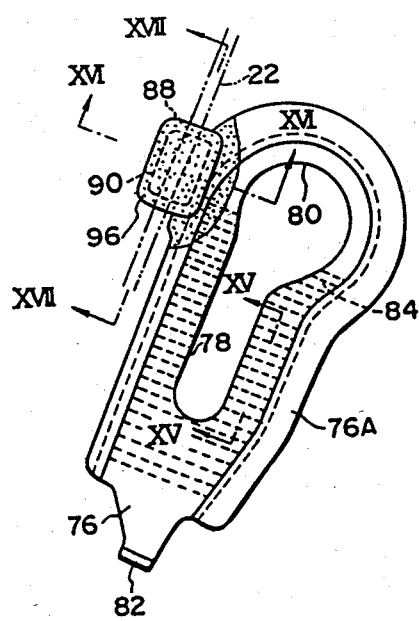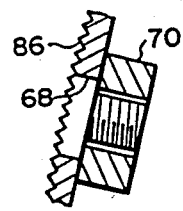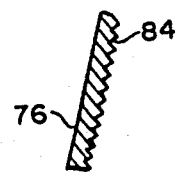

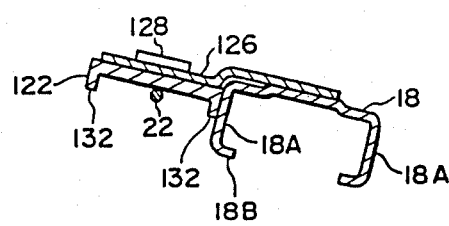
FIG-23
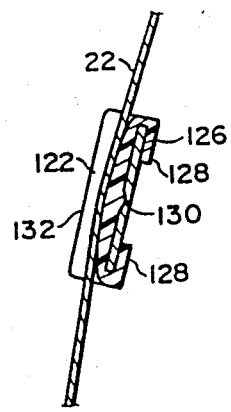
FIG-26
FIG-24
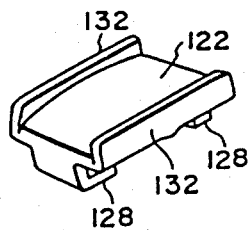
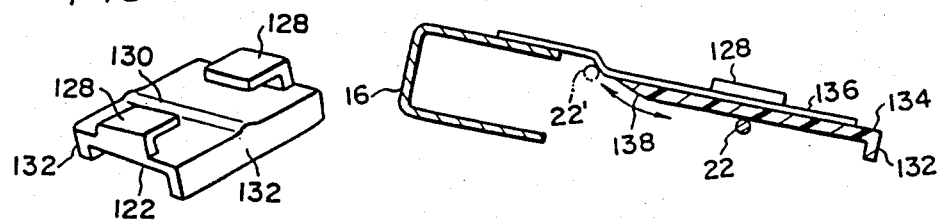
FIG-25
FIG-27

FIG-32
FIG-35
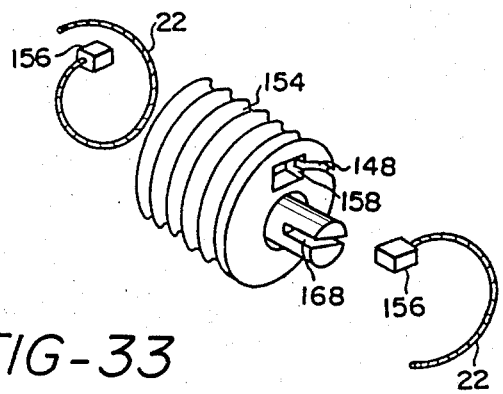
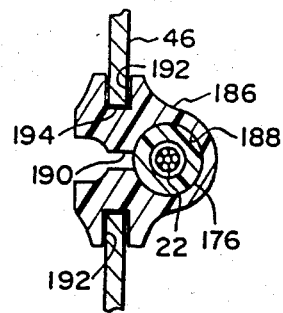
FIG-33
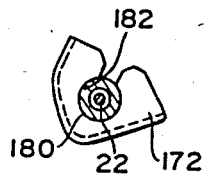
FIG-34
FIG-36
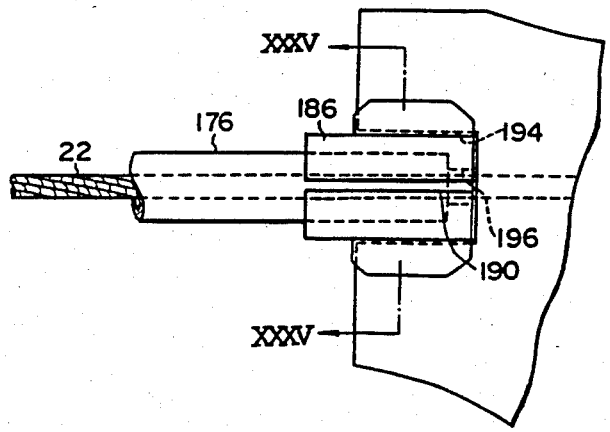
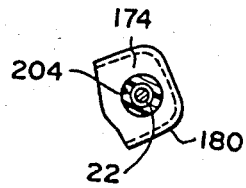

DOOR WINDOW REGULATOR

BACKGROUND OF THE INVENTION

1. Field of the Invention

The present invention relates to a door window regulator which vertically moves and guides a door window glass of an automobile.

2. Description of the Prior Art

In general, a door window regulator has an X-shaped arm made from steel sheet and is arranged such that a door window glass mounted on the upper end of the X-shaped arm is vertically moved by the pivoting of the X-shaped arm. The door window regulator employing such an X-shaped arm has a relatively large weight and a relatively large moving locus, which fact disadvantageously limits the range of available configurations and structures of the door.

In view of this fact, door window regulators have heretofore been proposed in which a wire is employed as a window glass driving means mainly from the viewpoint of reducing the weight of the apparatus.

Such conventional door window regulators include those shown in the specifications of Japanese patent Laid-Open No. 161,173/1980, Japanese Utility Model Laid-Open No. 41,996/1980 and West Germany Patent Laid-Open No. 3,108,557. In these prior arts, pulleys are rotatably supported at the respective upper and lower portions of a guide which is adapted for guiding the vertical movement of a window glass, and a wire is passed over these pulleys to thereby transmit driving force to the window glass.

These door window regulators, however, involve the following problem. The respective axes of the upper and lower pulleys extend parallel to each other and in the lateral direction of the vehicle, that is, in the direction orthogonal to the plane of the window glass. On the other hand, the longitudinal axis of the portion of the wire which extends from each of the pulleys to a driving unit is offset from the plane of rotation of the pulley. In consequence, the wire strongly presses against the side surface of the pulley groove, thus increasing the amount of friction occurring therebetween. This obstructs smooth rotation of the pulleys, causes the pulleys, the pulley shafts, the wire and so forth to become worn and consequently hinders smooth vertical movement of the window glass.

SUMMARY OF THE INVENTION

In view of the above-described fact, it is a primary object of the present invention to provide a door window regulator wherein the condition in which the wire is passed over the pulleys is maintained in an appropriate state.

To this end, the invention provides a door window regulator which comprises: upper and lower pulleys respectively disposed at the upper and lower portions of a door; a wire having a portion thereof stretched between the upper and lower pulleys and connected to the lower portion of a door window glass at the portion of the wire which extends between the upper and lower pulleys such that the wire forms a closed loop; and a driving unit adapted to actuate a portion of the closed loop wire. The portion of the wire which extends from either one of the pulleys to the driving unit is inclined toward the inside of the compartment, and the pulley from which the wire extends to the driving unit is disposed in such a manner that its axis of rotation is substantially orthogonal to the plane which includes the portion of the wire which extends from this pulley to the driving unit.

By virtue of the above-described arrangement, the condition in which the wire is passed over the pulley is maintained in an appropriate state at all times, whereby it is advantageously possible to reduce the friction occurring between the wire and the pulley, to ensure smooth rotation of the pulley and to facilitate the vertical movement of the window glass.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which:

FIG. 4 shows a portion of the front guide member as viewed in the direction of the arrow IV of FIG. 2;

FIG. 5 is a sectional view taken along the line V—V of FIG. 2;

FIG. 6 is a sectional view taken along the line VI—VI of FIG. 2;

FIG. 11 is a sectional view taken along the line XI—XI of FIG. 2;

FIG. 12 is an exploded perspective view of the front hook holder shown in FIG. 1;

FIG. 13 is a front elevational view of the front hook holder;

FIG. 14 is a sectional view taken along the line XIV—XIV of FIG. 10;

FIG. 15 is a sectional view taken along the line XV—XV of FIG. 13;

FIG. 23 is a sectional view taken along the line XXIII—XXIII of FIG. 7;

FIG. 24 is a perspective view of the rear wire guide shoe shown in FIG. 1;

FIG. 25 is a perspective view of the rear wire guide shoe in its inverted state;

FIG. 26 is a sectional view taken along the line XXVI—XXVI of FIG. 7;

FIG. 27 is a sectional view taken along the line XXVII—XXVII of FIG. 2;

FIG. 32 is an exploded perspective view showing the way in which each of the wire ends is secured to a drum;

FIG. 33 is a sectional view taken along the line XXXIII—XXXIII of FIG. 29;

FIG. 34 is an enlarged view of a portion, indicated by the arrow XXXIV, of the rear guide member shown in FIG. 7;

FIG. 35 is a sectional view taken along the line XXXV—XXXV of FIG. 34;

FIG. 36 is a sectional view taken along the line XXXVI—XXXVI of FIG. 29;

DESCRIPTION OF THE PREFERRED EMBODIMENTS

Figure 1:
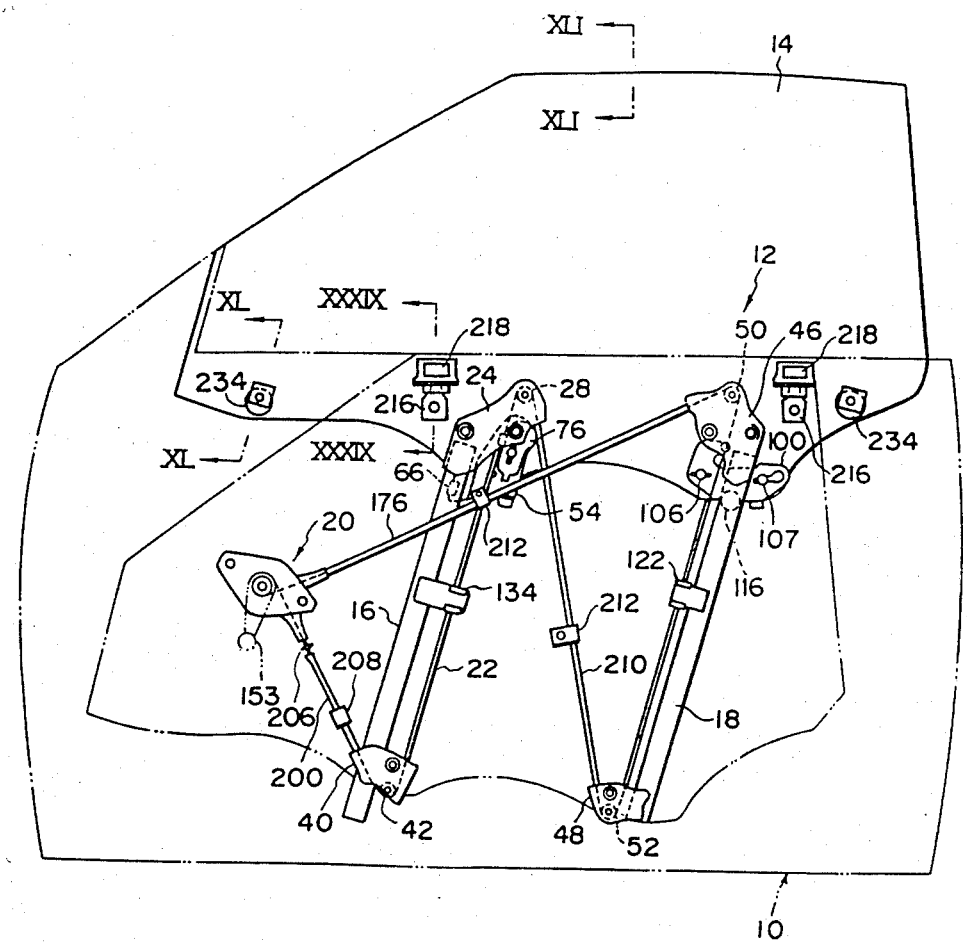
FIG. 1 is a front elevational view of a first embodiment of the door window regulator according to the present invention as viewed from the inside of the compartment of a vehicle equipped with the door window regulator.

Referring first to FIG. 1, there are shown a window regulator 12 and a window glass 14. The window regulator 12 is housed inside a door 10, while the window glass 14 is raised and lowered by the window regulator 12.

The window regulator 12 includes front and rear guide members 16 and 18 which are spaced from each other in the longitudinal direction of the vehicle. The front and rear guide members 16 and 18 are adapted to guide in combination the window glass 14 in the upward and downward directions. A driving unit 20 is disposed outside the front and rear guide members 16 and 18 and at a position closer to the front end of the vehicle where it is convenient to operate a door handle 153. Further, a wire 22 is stretched between the front and rear guide members 16, 18 and the driving unit 20 and is adapted to apply actuating force to the window glass 14 by which it is raised or lowered. The wire 22 is constituted by a plurality of thin steel wires which are twisted together.

Figure 2:
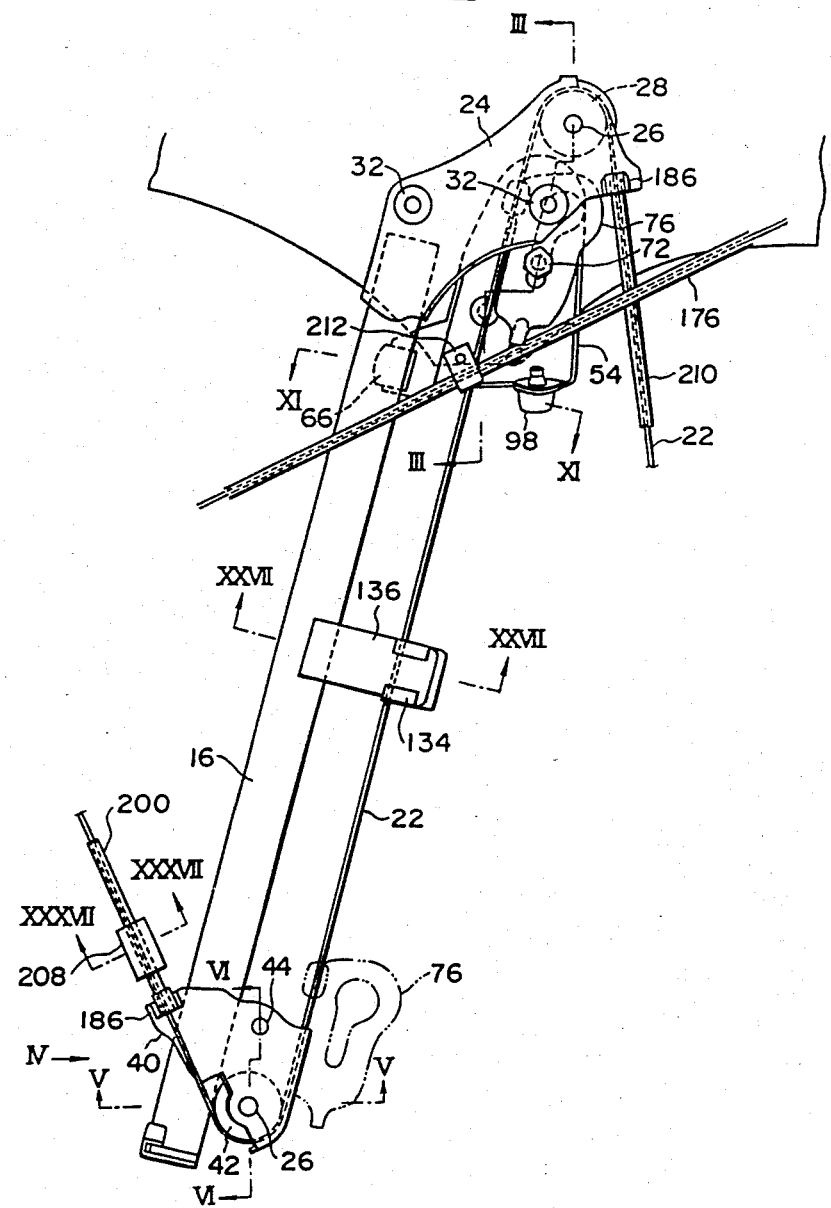
FIG. 2 is an enlarged front elevational view of the front guide member shown in FIG. 1.
Figure 3:
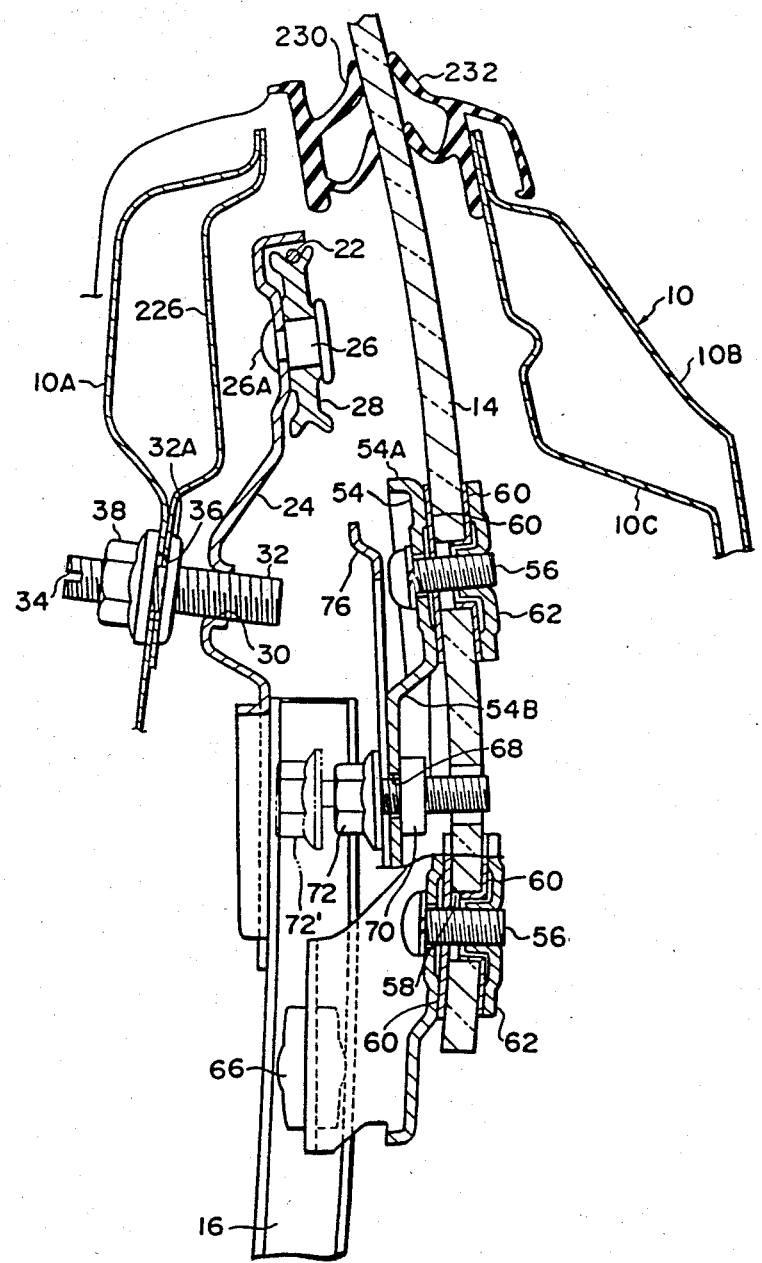
FIG. 3 is a sectional view taken along the line III—III of FIG. 2.

As shown in FIGS. 2 and 3, a front guide upper bracket 24 is welded to the upper end portion of the front guide member 16, and a front upper pulley 28 is rotatably supported on the front guide upper bracket 24 through a shaft 26. The shaft 26 is formed with a step which enables the front upper pulley 28 to rotate smoothly without being pressed in the axial direction of the shaft 26 even through the distal end portion 26A of the shaft 26 is firmly caulked toward the front upper pulley 28.

As shown in FIG. 3, the front guide upper bracket 24 is formed with an internal thread 30, and a mounting bolt 32 is screwed into the internal thread 30 from the inside of the compartment. The bolt 32 has a collar 32A at its intermediate portion and is formed with a minus groove 34 at its head portion, which is the end portion of the bolt 32 on the side thereof which is closer to the inside of the compartment.

Accordingly, to mount the front guide member 16 on the door 10, the head portion of the mounting bolt 32 screwed into the internal thread 30 of the front guide upper bracket 24 is received through a mounting bore 36 which is formed in an inner panel 10A of the door 10 and, then, a nut 38 is screwed onto the head portion of the bolt 32 from the inside of the compartment. Consequently, the bolt 32 is reliably secured to the inner panel 10A, and the upper end portion of the front guide member 16 is thereby mounted on the door 10.

In this case, before the nut 38 is firmly tightened, if a screw driver or similar tool is applied to the groove 34 of the mounting bolt 32 and the bolt 32 is thereby turned, it is then possible to effect a fine adjustment of the mounting position of the front guide member 16 in the direction of the width of the vehicle.

As shown in FIG. 2, a front guide lower bracket 40 is welded to the lower end portion of the front guide member 16. The front guide lower bracket 40 is, as also shown in FIGS. 4 and 5, provided with a front lower pulley 42 which is rotatably supported through a shaft 26 in a manner similar to that at the upper end portion of the front guide portion 16, the front lower pulley 42 being disposed substantially between the front guide member 16 and the inner panel 10A of the door 10.

The front guide lower bracket 40 has, as shown in FIG. 6, a mounting bolt 44 welded to a portion thereof. By employing this mounting bolt 44, the lower end portion of the front guide member 16 is secured to the inner panel 10A of the door 10.

In this case, the front guide lower bracket 40 is, as shown in FIG. 5, disposed in such a manner that its longitudinal axis is inclined relative to the longitudinal direction of the vehicle (indicated by the arrows FR and RE) as shown by the arrow P and, therefore, the axis of the shaft 26 extends in the direction orthogonal to the longitudinal axis of the front guide lower bracket 40. In consequence, it is possible for the wire 22 passed over the front lower pulley 42 to move smoothly without producing a large frictional force between the wire 22 and the V-grooved side surface of the pulley 42. Further, the front guide lower bracket 40 has a cut portion 40A which is formed by cutting off a portion of the bracket 40 on the side thereof which is closer to the inside of the vehicle, whereby any interference of the front guide lower bracket 40 with the inner panel 10A is avoided. Since the front guide lower bracket 40 is disposed with an inclination as described above, it is only necessary for a small amount of cutting to be employed in forming the cut portion 40A. If the front guide lower bracket 40 were disposed with no inclination, it would be necessary to cut the greater part of the front guide lower bracket 40, which would result in a lowering in the strength of the bracket 40 by which the front lower pulley 42 is supported.

Furthermore, the front lower pulley 42 is disposed rearwardly of the front guide member 16 in terms of the longitudinal direction of the vehicle, and the wire 22 which extends to the driving unit 20 from the pulley 42 is disposed such as to cross the front guide member 16. By virtue of such disposition, it is possible to reduce the longitudinal length of the front guide member 16, and it becomes possible to reliably support the window glass 14 as described later.

Figure 7:
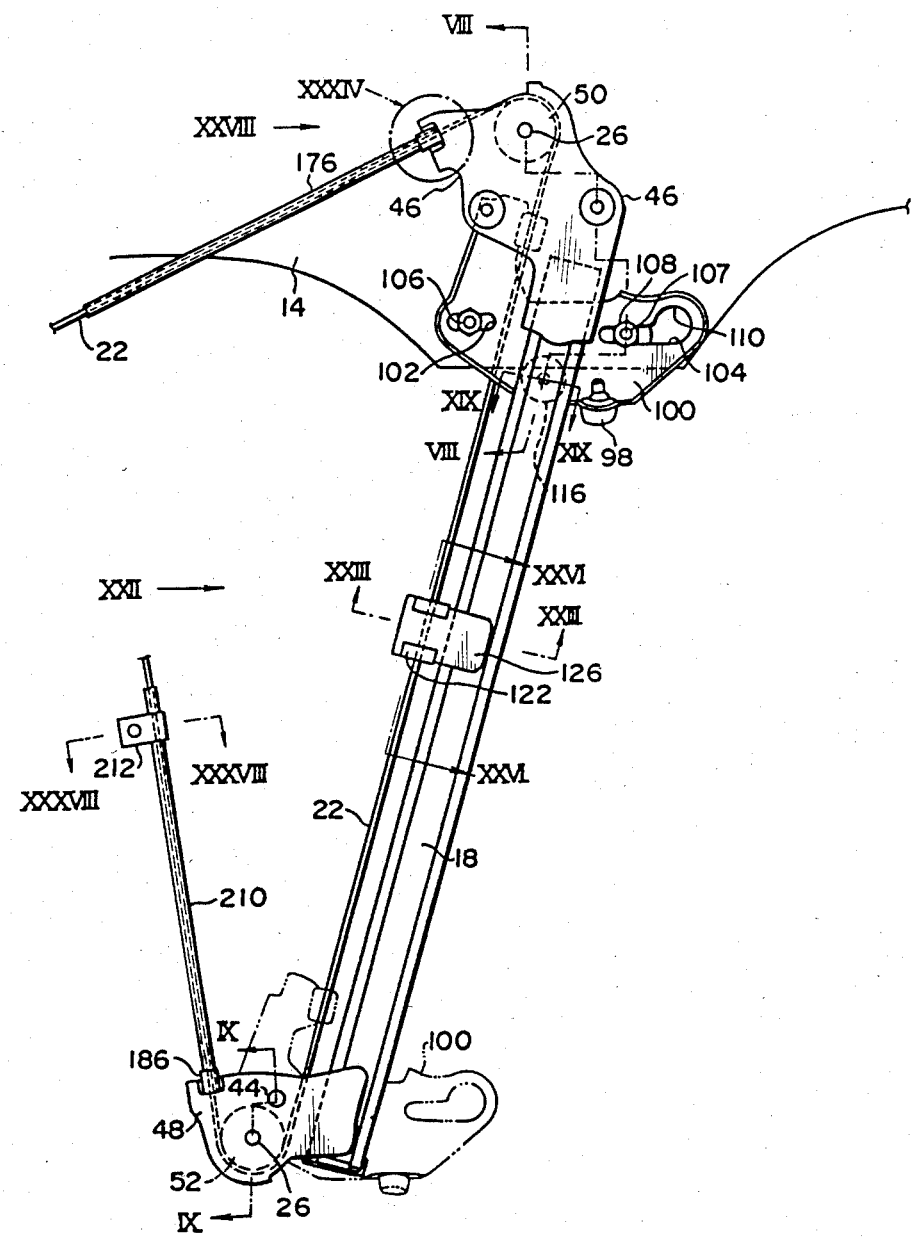
FIG. 7 is an enlarged front elevational view of the rear guide member shown in FIG. 1.

On the other hand, the rear guide member 18 is, as shown in FIG. 1, disposed in parallel to the front guide member 16 and closer to the rear end of the vehicle than the latter. The rear guide member 18 also has a rear guide upper bracket 46 and a rear guide lower bracket 48 welded thereto in the manner shown in FIGS. 7 to 9. In the manner similar to that of the brackets 24 and 40 of the front guide member 16, the rear guide upper and lower brackets 46 and 48 respectively have rear upper and lower pulleys 50 and 52 rotatably supported thereon through associated shafts 26, and the wire 22 is stretched between these pulleys 50 and 52.

Figure 9:
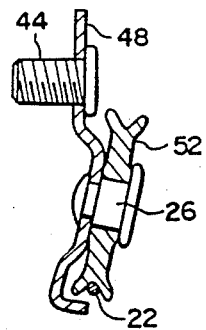
FIG. 9 is a sectional view taken along the line IX—IX of FIG. 7.

Further, the rear guide upper and lower brackets 46 and 48 are adapted to be secured to the inner panel 10A of the door 10 by respectively employing a combination of a mounting bolt 32 and a nut 38 and a mounting bolt 44. FIG. 9 shows the way in which the rear guide lower bracket 48 is mounted.

The wire 22 is disposed, as shown in FIG. 1, such as to form a closed loop in which the wire 22 extends from the driving unit 20 and is successively passed over the rear upper pulley 50, the rear lower pulley 52, the front upper pulley 28 and the front lower pulley 42 and then returns to the driving unit 20. The wire 22 is connected to the window glass 14 at its two portions, that is, one between the front upper and lower pulleys 28 and 42 and the other between the rear upper and lower pulleys 50 and 52.

Description will now be made of the wire connecting structure and the structure whereby the window glass 14 is secured to the front and rear guide members 16 and 18.

Figure 10:
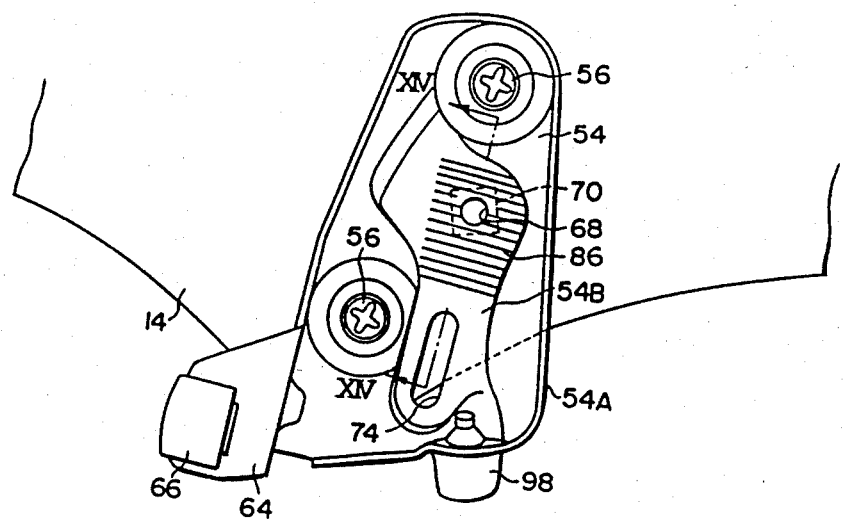
FIG. 10 is an enlarged front elevational view of the front glass bracket shown in FIG. 1.

Referring now to FIG. 10, a front glass bracket 54 is secured to the lower end portion of the window glass 14. The front glass bracket 54 is formed from steel sheet and has a bent portion 54A formed along its circumference. The front glass bracket 54 is firmly fixed to the window glass 14 by a pair of screws 56. As shown in FIG. 3, the window glass 14 is formed with circular bores 58 at portions thereof where the respective screws 56 are to be received. The screws 56 are respectively screwed into nuts 62 which are disposed such as to abut against the outer surface of the vehicle body after synthetic resin fillers 60 have been placed on both side surfaces of the window glass 14.

An arm 64 projects from the end of the front glass bracket 54 on the side thereof which is closer to the front end of the vehicle. The arm 64 has a front slider 66 secured to its distal end portion. The front slider 66 is inserted into the front guide member 16 and is brought into contact with the inner peripheral surface of the front guide member 16, as also shown in FIG. 11. More specifically, the front slider 66 is formed with a substantially cylindrical shape and is disposed in such a manner that its axis extends longitudinally of the front guide member 16. On the other hand, the front guide member 16 is bent such as to have a U-shaped cross-sectional configuration and is disposed in such a manner that its opening is directed toward the rear end of the vehicle. Accordingly, the movement of the front slider 66 toward the outside of the compartment (in the direction of the arrow OUT) and toward the inside of the compartment (in the direction of the arrow IN) is restricted, whereby the front slider 66 is prevented from moving in the lateral direction of the vehicle but allowed to move toward the front end of the vehicle (in the direction of the arrow FR) and toward the rear end of the vehicle (in the direction of the arrow RE). It is to be noted that the front slider 66 is preferably formed with a barrel-like shape in which the axially central portion is larger than both end portions in terms of the outside diameter so that the front slider 66 is able to move smoothly within the front guide member 16.

The front glass bracket 54 has a protuberance 54B formed in its center, the protuberance 54B protruding toward the inside of the compartment. The protuberance 54B is formed with a circular bore 68 as shown in FIG. 3. In addition, a nut 70 is welded to the protuberance 54B on the side thereof which is closer to the outside of the compartment in such a manner that the nut 70 corresponds to the bore 68, and a bolt 72 is screwed into the nut 70 from the inside of the compartment. This bolt 72 is employed to mount a front hook holder 76, together with a slot 74 which is formed in the protuberance 54B. In assembly, the bolt 72 has previously been mounted in the tentatively assembled state 72' shown by the imaginary line in FIG. 3.

The front hook holder 76 is, as shown in FIGS. 12 and 3, formed by blanking steel sheet and has a stepped bent portion 76A formed along its circumference. The front hook holder 76 is formed in its center with the slot 78 which is employed to receive and tighten the bolt 72 on the front glass bracket 54 as shown in FIG. 3. Further, a circular bore 80 is formed at one end of the slot 78 such as to communicate with the latter, whereby it is possible to pass the head portion of the bolt 72 which has been tentatively mounted on the front glass bracket 54 through the circular bore 80.

Moreover, a projection 82 is formed at one end of the front hook holder 76 by bending the end portion of the holder 76 at right angles. The projection 82 is adapted to be inserted into the slot 74 of the front glass bracket 54 shown in FIG. 10. Accordingly, the relative movement of the front hook holder 76 in the direction orthogonal to the longitudinal axis of the slot 74 in the front glass bracket 54 is limited by the projection 82 whose movement is limited by the slot 74 and the slot 78 whose movement is limited by the bolt 72. After the relative position of the front hook holder 76 in the longitudinal direction of the slot 74 has been properly adjusted, the bolt 72 is screwed into the nut 70, whereby the front hook holder 76 is firmly secured to the front glass bracket 54.

The respective contact surfaces of the front hook holder 76 and the front glass bracket 54 are formed with corrugated irregularities 84 and 86 as shown in FIGS. 14 and 15, thereby allowing both of them to be further reliably connected together. The corrugated irregularity 86 is formed around the circular bore 68 in the protuberance 54B of the front glass bracket 54, while the corrugated irregularity 84 is formed around the slot 78 in the front hook holder 76.

The front hook holder 76 further has a wire mounting member 88 projecting from a portion thereof. The wire mounting member 88 has a box-like shape with one open end and is formed with a wire passing notch 92 such as to be able to receive a wire hook 90 which is secured to a portion of the wire 22 by caulking in the shape of a substantially quadrangular prism in the manner shown in FIG. 12.

Figure 16:
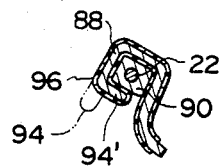
FIG. 16 is a sectional view taken along the line XVI—XVI of FIG. 13.
Figure 17:
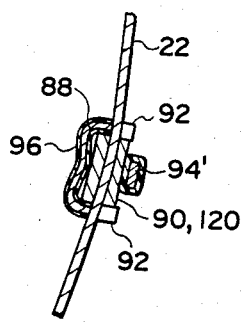
FIG. 17 corresponds to a sectional view taken along the line XVII—XVII of FIG. 13 and a sectional view taken along the line XVII—XVII of FIG. 18.

In order to secure the wire hook 90 received in the wire mounting member 88, a projecting piece 94 (see FIG. 16) which projects from a portion of the wire mounting member 88 is bent after the wire hook 90 has been inserted into the wire mounting member 88 as shown in FIGS. 16 and 17, thereby forming a bent projecting piece 94', and the wire hook 90 is thus clamped between the bent projecting piece 94' and the wire mounting member 88.

In this case, a synthetic resin coating 96 is applied to both the wire mounting member 88 and the projecting piece 94, thereby preventing generation of any abnormal noise which would occur as the result of contact between the wire hook 90 on one hand and the wire mounting member 88 and the projecting piece 94 on the other. More specifically, as shown in FIG. 17, a slight gap may be produced between the wire mounting member 88 and each of the axial end portions of the wire hook 90 as the result of dimensional tolerances in production. Therefore, if such a gap is present, when the wire 22 moves in its longitudinal direction, the wire hook 90 which receives the driving force applied to the wire 22 moves slightly within the wire mounting member 88 by an amount corresponding to the gap. In such a case, however, any abnormal noise generated as the result of collision of the wire hook 90 against the inner surface of the wire mounting member 88 can be absorbed by the synthetic resin coating 96.

On the other hand, the longitudinal length of the wire mounting member 88 may be slightly smaller than the longitudinal length of the wire hook 90. In such a case also, it is possible to insert the wire hook 90 into the wire mounting member 88 by virtue of deflection of the synthetic resin coating 96.

It is to be noted that a cushioning rubber 98 is attached to the bent portion 54A of the front glass bracket 54 in the manner shown in FIG. 10. The cushioning rubber 98 is adapted to abut against the lower surface portion of the inner panel 10A of the door 10 when the front glass bracket 54 is maximumly lowered, thereby forming a stopper which limits the lowered position of the window glass 14.

Thus, the front glass bracket 54 allows the window glass 14 to be supported by the front guide member 16 and thereby guided in the vertical direction of the vehicle. Moreover, the front glass bracket 54 connects the window glass 14 and the portion of the wire 22 between the front upper and lower pulleys 28 and 42 through the front hook holder 76, whereby the driving force applied through the wire 22 is transmitted to the window glass 14.

Figure 18:
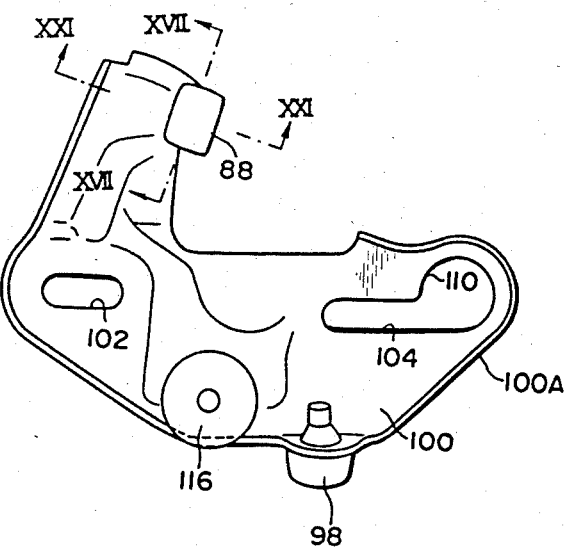
FIG. 18 is an enlarged front elevational view of the rear glass bracket shown in FIG. 1.

The connection between the rear guide member 18 and the window glass 14 is effected through a rear glass bracket 100 which is also shown in FIG. 18. The rear glass bracket 100 is formed from steel sheet in a manner similar to that of the front glass bracket 54 and has a bent portion 100A formed along its circumference. The rear glass bracket 100 has a pair of slots 102 and 104 bored in its central portions and spaced from each other in the horizontal direction. The slots 102 and 104 are respectively employed to receive mounting bolts 106 and 107 shown in FIGS. 1 and 8. Each of the mounting bolts 106 and 107 has a collar 106A at its intermediate portion and is secured to the window glass 14 through synthetic resin fillers 60 and a nut 62 in a manner similar to that of the front glass bracket 54 shown in FIG. 3.

In assembly, a nut 108 is screwed onto the threaded distal end portion of each of the mounting bolts 106 and 107 which projects from the rear glass bracket 100, whereby the bracket 100 is secured to the window glass 14. In this case, a circular bore 110 is formed in the rear glass bracket 100 such as to communicate with the slot 104. Thus, it is possible to pass the nut 108 through the circular bore 110 in the state wherein the nut 108 is tentatively mounted on the mounting bolt 107 as shown by the imaginary line 108' in FIG. 8, whereby the assembling operation is facilitated.

Figure 19:
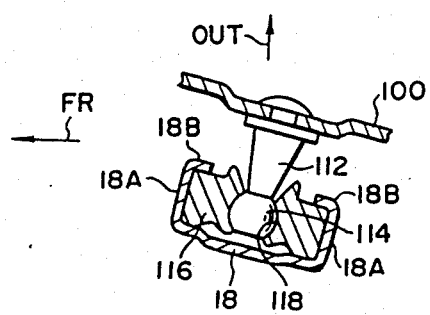
FIG. 19 is a sectional view taken along the line XIX—XIX of FIG. 7.
Figure 20:
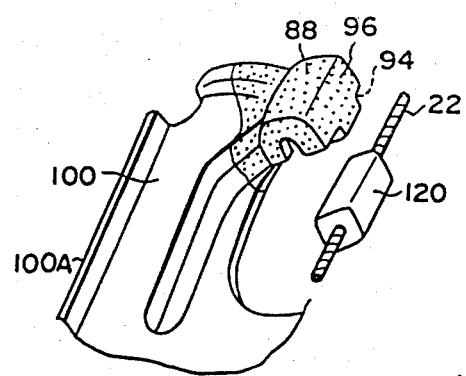
FIG. 20 is an exploded perspective view showing the wire mounting portion of the rear glass bracket.
Figure 21:
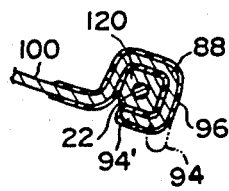
FIG. 21 is a sectional view taken along the line XXI—XXI of FIG. 18.

The rear glass bracket 100 has a pin 112 projecting from a portion thereof in the manner shown in FIG. 19, the pin 112 being secured to the bracket 100 by caulking or other means. The pin 112 has a ball 114 formed at its distal end. The ball 114 is rotatably supported within a spherical recess 118 which is formed in a rear slider 116, thereby making the rear slider 116 rotatable.

The rear slider 116 has a substantially disk-like shape. The rear slider 116 is housed within the rear guide member 18 and is adapted to allow the window glass 14 to be supported by the rear guide member 18 in a manner similar to that of the front slider 66 in the front guide member 16. The rear guide member 18 has a substantially C-shaped cross-section with its open side facing outwardly of the compartment. The rear guide member 18 includes leg portions 18A which are formed by bending both its end portions in the longitudinal direction of the vehicle at right angles and retainer pieces 18B which are respectively formed by bending the distal end portions of the leg portions 18A at right angles. Thus, the rear guide member 18 limits the movement of the rear slider 116 toward the outside and inside of the compartment and toward the front and rear ends of the vehicle. Consequently, it is possible for the rear slider 116 to move only in the vertical direction along the longitudinal axis of the rear guide member 16.

The rear glass bracket 100 has a wire mounting member 88 projecting from a portion thereof in a manner similar to that of the front glass bracket 54. The wire mounting member 88 is also adapted to house a wire hook 120 which is secured to an intermediate portion of the wire 22 by caulking and to retain the wire hook 120 by means of a projecting piece 94. Further, the wire mounting member 88 has a synthetic resin coating 96 applied thereto in a manner similar to that of the wire mounting member 88 of the front hook holder 76, thereby absorbing any abnormal noise generated between the wire mounting member 88 and the wire hook 120.

Thus, the rear glass bracket 100 allows the lower rear portion of the window glass 14 supported and guided by the rear guide member 18 and connected to the wire 22, whereby the driving force applied through the wire 22 is transmitted to the window glass 14.

Figure 22:
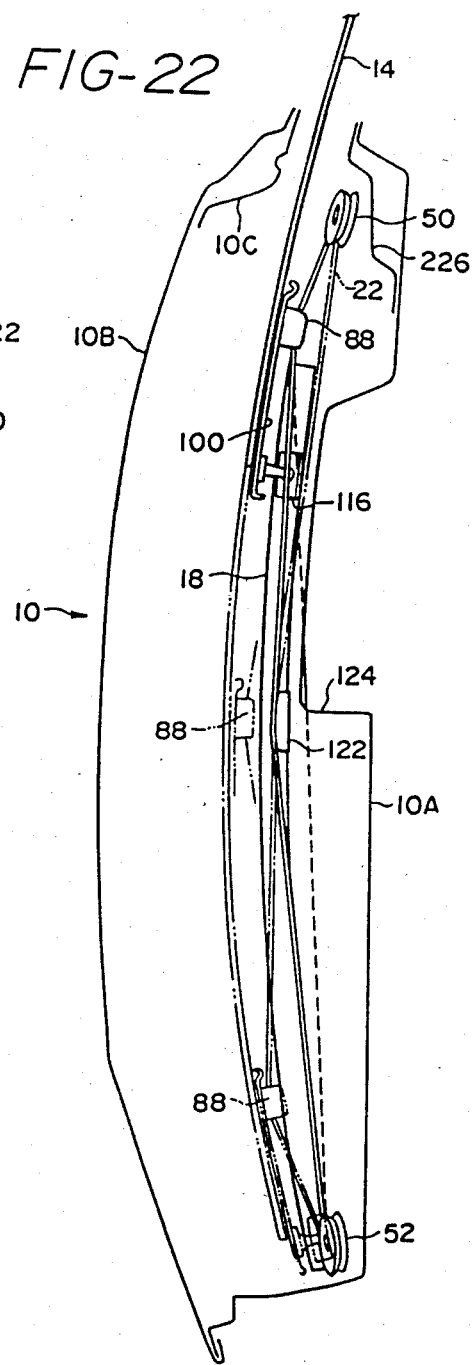
FIG. 22 shows a portion of the rear guide member as viewed in the direction of the arrow XXII of FIG. 7.

Each of the front and rear guide members 16 and 18 is formed with a curved shape in which the vertically central portion thereof is deflected toward the outside of the compartment in harmony with the window glass 14, FIG. 22 exemplarily showing the rear guide member 18. Thus, it is possible for the front and rear guide members 16 and 18 to smoothly raise and lower the window glass 14 which has a curved surface deflected toward the outside of the compartment.

Further, as shown in FIG. 22, the portion of the wire 22 between the rear upper and lower pulleys 50 and 52 is bent by means of a rear wire guide shoe 122 which is provided at an intermediate portion of the rear guide member 18. By virtue of such a structure, it is possible for the inner panel 10A of the door 10 to be partially bent toward the outside of the compartment and to be formed with a recess 124, by which means the housing space inside the compartment is enlarged. The above-described structure in which the wire 22 is bent at its intermediate portion is characteristic of the window regulator which employs the wire 22. It is not possible for the conventional window regulators which employ an X-shaped arm to obtain such an advantageous structure.

Referring now to FIG. 23, the rear wire guide shoe 122 is mounted on the rear guide member 18 through a rear shoe bracket 126. More specifically, the proximal end portion of the rear shoe bracket 126 is welded to the rear guide member 18, while the distal end portion of the bracket 126 projects in the direction orthognal to the longitudinal direction of the rear guide member 18 and is inserted into a pair of U-shaped grooves which are defined by a pair of L-shaped holders 128 which project from both sides of the reverse surface of the rear wire guide shoe 122 as shown in FIGS. 24 and 25, whereby the rear wire guide shoe 122 is retained on the rear guide member 18. The rear wire guide shoe 122 has a rib 130 projecting from its reverse surface and between the L-shaped holders 128. The rib 130 serves to reliably retain the rear shoe bracket 126 in cooperation with the L-shaped holders 128.

The slide contact surface of the rear wire guide shoe 122 where it is in slide contact with the wire 22 has a circular cross-section with a predetermined curvature as shown in FIG. 26, thereby preventing any damage to the wire 22 which would be caused as the result of contact between the wire 22 and the edges at both ends of the rear wire guide shoe 122. Further, a pair of stoppers 132 respectively project from those sides of the slide contact surface of the rear wire guide shoe 122 which are in front and at the rear of the wire 22 in terms of the longitudinal direction of the vehicle, the stoppers 132 projecting toward the outside of the compartment at right angles with respect to the slide contact surface. Consequently, the stoppers 132 limit the movement of the wire 22 when it moves longitudinally of the vehicle within the rear wire guide shoe 122.

Referring next to FIG. 27, there is shown a front wire guide shoe 134 which is secured to an intermediate portion of the front guide member 16. The front wire guide shoe 134 is firmly secured to the front guide member 16 through a front shoe bracket 136 in a manner similar to that of the rear wire guide shoe 122.

Further, the front wire guide shoe 134 has a stopper 132 similar to that of the rear wire guide shoe 122. However, the stopper 132 is provided on only one of the sides thereof in the longitudinal direction of the vehicle. Moreover, the portion of the slide contact surface of the front wire guide shoe 134 on the side thereof which is closer to the front guide member 16 is formed into a slanting surface 138 by gradually reducing the wall thickness of the front wire guide shoe 134. Accordingly, the front wire guide shoe 134 does not interefere at any point with the front glass bracket 54 or the front hook holder 76 which are guided by the front guide member 16 and is still able to limit the shifting of the wire 22 in the longitudinal direction of the vehicle. Even in the case where the wire 22' shifts longitudinally relative to the vehicle such as to approach the front guide member 16, it is possible when the wire 22 thus shifted is restored for the wire 22 to easily climb the slanting surface 138 and to return to the position shown in FIG. 27.

Figure 28:
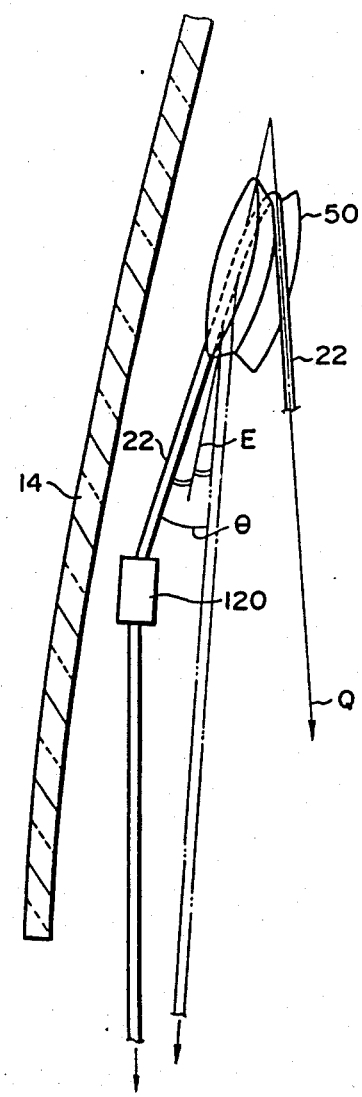
FIG. 28 shows a portion of the rear guide member as viewed in the direction of the arrows XXVIII of FIG. 7.

FIG. 28 illustrates the mounting angle of the rear upper pulley 50. The rear upper pulley 50 is preferably disposed in such a manner that its axis of rotation is orthogonal to the plane which includes the portion of the wire 22 which extends from the rear upper pulley 50 to the driving unit 20 (in the direction of the arrow Q) and is also orthogonal to the portion of the wire 22 which extends between the rear upper pulley 50 and the wire hook 120. By disposing the rear upper pulley 50 in the above-described manner, it is possible to reduce the friction occurring between the wire 22 and the side surfaces of the groove of the rear upper pulley 50. It is possible at the same time to reduce the load applied in the direction of thrust of the pulley 50 and consequently decrease the resistance to the rotation of the pulley 50.

Since the dimension of the driving unit 20 in the lateral direction of the compartment is large, in order to avoid any interference with the inner surface of the glass 4, the portion of the wire 22 which extends from the rear upper pulley 50 to the driving unit 20 is disposed closer to the inside of the compartment than the guide member 16, so that the wire 22 is directed in the direction of the arrow Q, that is, in the direction in which the wire 22 is inclined toward the inside of the compartment.

The portion of the wire 22 between the rear upper pulley 50 and the rear slider 116 differs in its position depending upon the position of the window glass 14. When the window glass 14 is at its maximumly raised position, the wire portion extends as shown by the solid line in FIG. 28; when the window glass 14 is at its maximumly lowered position, the wire portion extends as shown by the imaginary line in the Figure. Thus, that portion of the wire 22 involves the included angle $\theta$. Accordingly, the plane which is orthogonal to the axis of the rear upper pulley 50 is preferably set such as to include the line E which halves the included angle $\theta$. The above-described difference in position of the wire 22 depending on the position of the window glass 14 is inevitably caused in the case where the window glass 14 has a curvature.

Figure 29:
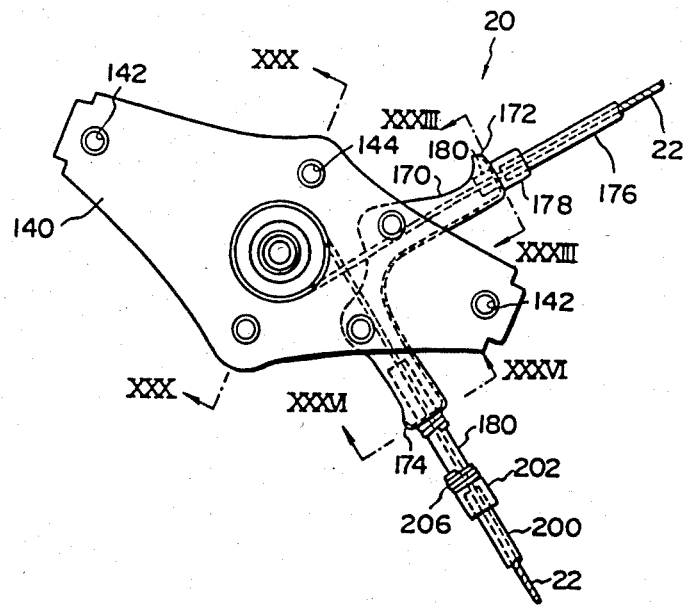
FIG. 29 is an enlarged front elevational view of the driving unit shown in FIG. 1.
Figure 30:
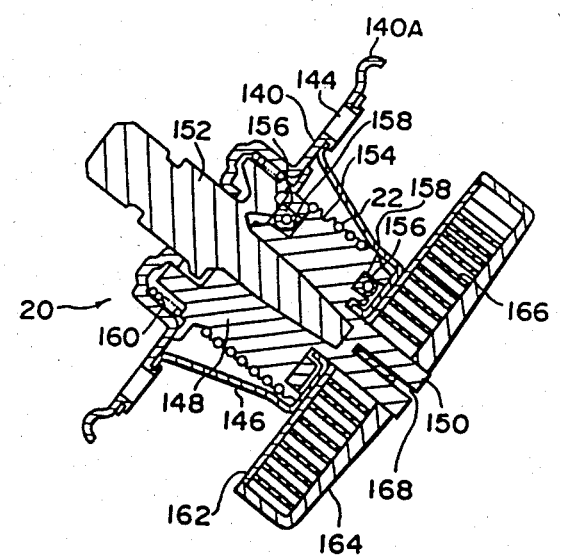
FIG. 30 is a sectional view taken along the line XXX—XXX of FIG. 29.

The driving unit 20 will now be described with reference to FIGS. 29 to 31.

A base plate 140 is formed from steel sheet and has a bent portion 140A formed along its circumference. The base plate 140 has extended portions at both its ends in which internal threads 142 are respectively formed, which allow the base plate 140 to be secured to the inner panel 10A of the door 10 by screws, not shown.

A drum case 146 is secured to the base plate 140 at both its ends by means of caulking portions 144. The drum case 146 rotatably supports a drum shaft 150 which projects from a drum 148. The drum 148 rotatably supports a handle shaft 152 which is further rotatably supported by the base plate 140.

Referring next to FIG. 32, the drum 148 has a spiral groove 154 formed on its outer periphery. Both ends of the wire 22 are wound on the spiral groove 154 in the opposite directions. Each of the wire ends 156 which are respectively secured to both end portions of the wire 22 is inserted into the corresponding one of the end retainer grooves 158 which are respectively formed at both axial ends of the drum 148, thereby preventing undesirable removal of the wire 22 from the drum 154. Thus, both end portions of the wire 22 are connected together through the drum 148, whereby the wire 22 is formed into a closed loop.

In this case, the drum 148 is arranged such that, when it rotates in one direction, one end of the wire 22 is unwound from the spiral groove 154, while the other end is rewound on the spiral groove 154. A coil spring 160 is provided between the handle shaft 152 and the base plate 140 for the purpose of preventing the handle shaft 152 from being turned reversely even if tension acts on the wire 22. Since the action of the coil spring 160 for preventing the reverse turning of the handle shaft 152 is well known, description thereof is omitted.

A spring case 164 is mounted on the drum case 146 with a spring cover 162 interposed therebetween. The spring case 164 houses a spiral spring 166 and retains the outer end of the spiral spring 166. The inner end of the spiral spring 166 is retained by a slit 168 which is formed in the drum shaft 150. The arrangement is such that the spring 166 applies biasing force to the drum shaft 150 by which it is able to rotate when the window glass 14 is being raised against the weight of the glass 14.

Figure 31:
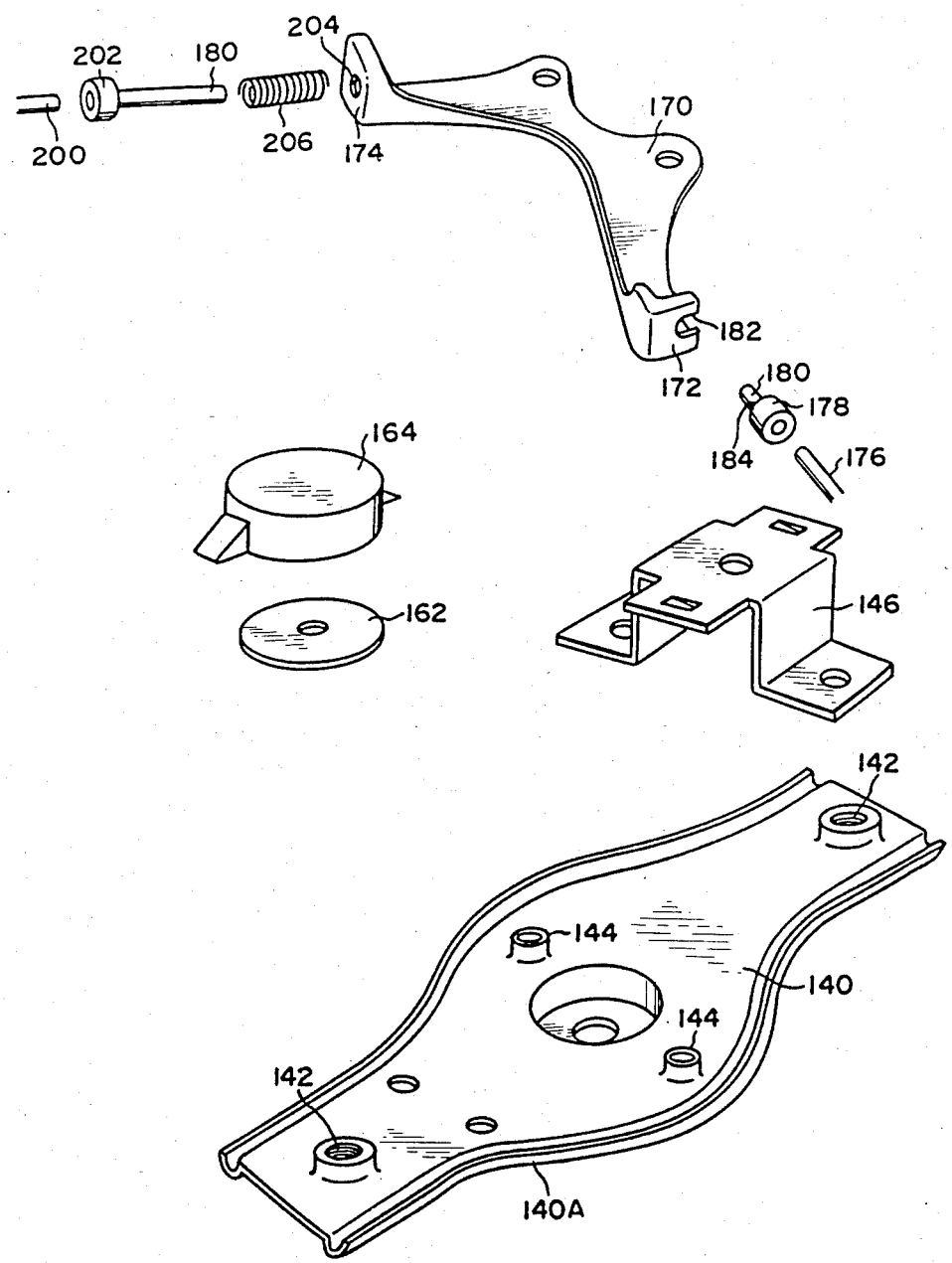
FIG. 31 is an exploded perspective view of a subsidiary base and associated members.

The base plate 140 has a subsidiary base 170 secured thereto by caulking, as clearly shown in FIG. 31. The subsidiary base 170 is formed by bending steel sheet and has retainer holding projections 172 and 174 respectively projecting from both its end portions.

A wire tube 176 is stretched between the retainer holding projection 172 and the rear guide upper bracket 46 on the rear guide member 18. The wire tube 176 is formed from a flexible material such as a synthetic resin and has the wire 22 extending through the inside thereof.

As shown in FIGS. 31 and 33, one of the ends of the wire tube 176 is inserted into a wire tube retainer 178 in such a manner as to be retained thereby. A smaller-diameter portion 180 of the wire tube retainer 178 is inserted into a bore 182 which is formed in the retainer holding projection 172 until a stepped portion 184 of the wire tube retainer 178 abuts against the retainer projection 172, whereby the wire tube retainer 178 is retained by the retainer holding projection 172. The bore 182 is provided with an opening which has a width smaller than the diameter of the smaller-diameter portion 180 of the wire tube retainer 178, thereby preventing the retainer 178 from coming off the bore 182.

On the other hand, the other end of the wire tube 176 is retained by the rear guide upper bracket 46 through a wire tube retainer 186, as shown in FIGS. 34 and 35. The wire tube retainer 186 is formed with an insertion bore 188 for receiving the wire tube 176 and further provided with a wire passing bore 196 in coaxial relation to the wire tube 176. The insertion bore 188 and the wire passing bore 196 are both communicated with the outside through a slit 190.

The wire tube retainer 186 further has a pair of grooves 192 respectively formed in both its side portions. Thus, the wire tube retainer 186 is fitted on the peripheral edge portion of a rectangular groove 194 which is formed in the rear guide upper bracket 46 through the grooves 192. In assembly, the wire 22 is passed through the slit 190 in the tube retainer 186, and the tube 176 having the wire 22 received therein is inserted into the insertion bore 188, the tube retainer 186 then being fitted into the rectangular groove 194 of the rear guide upper bracket 46 through the grooves 192. As a result, the width of the slit 190 is reduced, and the insertion bore 188 is consequently reduced in size, which fact makes it possible for the wire tube retainer 186 to reliably retain the wire tube 176.

On the other hand, a wire tube 200 is stretched between the retainer holding projection 174 of the subsidiary base 170 and the front lower guide bracket 40 on the front guide member 16. A wire tube retainer 186 shown in FIGS. 34 and 35 is applied to the joint between the wire tube 200 and the front guide lower bracket 40 in a manner similar to that of the joint between the wire tube 176 and the rear guide upper bracket 46.

The end portion of the wire tube 200 on the side thereof which is closer to the subsidiary base 170 is inserted into a wire tube retainer 202 shown in FIGS. 31 and 36. A smaller-diameter portion 180 of the wire tube retainer 202 has a larger axial length than that of the smaller-diameter portion 180 of the wire tube retainer 178, so that it is possible to vary the degree of insertion of the smaller-diameter portion 180 in a circular bore 204 which is formed in the retainer holding projection 174. A compression coil spring 206 is interposed between the retainer holding projection 174 and the wire tube retainer 202 such as to bias the wire tube retainer 202 in the direction in which it comes away from the retainer holding projection 174. Tension is thereby constantly applied to the portion of the wire 22 between the driving unit 20 and the front guide lower bracket 40, whereby it is possible for the closed loop of the wire 22 to have a proper tension. The compression coil spring 206 further serves to prevent the wire tubes 176, 200 and 210 from coming off the respective brackets.

The driving unit 20 is, as shown in FIG. 1, disposed in front of the parallel front and rear guide members 16 and 18 in terms of the longitudinal direction of the vehicle. In consequence, it is possible for the guide members 16 and 18 to support the weight of the window glass 14 in a well-balanced state, and the driving unit 20 which is disposed in front of them allows the door handle 153 to be disposed at a position where the occupant of the vehicle can easily actuate the same.

Figure 37:
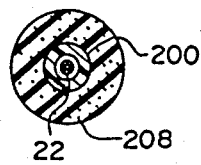
FIG. 37 is a sectional view taken along the line XXXVII—XXXVII of FIG. 2.

As also shown in FIG. 37, a cylindrical silencer 208 is attached on a portion of the outer periphery of the wire tube 200. The silencer 208 serves to absorb vibrations and any shock occurring as a result of the collision of the wire tube 200 against the inner panel 10A of the door 10.

The wire tube 210 is stretched between the front guide upper bracket 24 at the upper end portion of the front guide member 16 and the rear guide lower bracket 48 at the lower end portion of the rear guide member 18 such as to guide the portion of the wire 22 present therebetween. The wire tube 210 has a structure similar to those of the wire tubes 176 and 200. The wire tube 210 has wire tube retainers 186 respectively attached to both its end portions, the wire tube retainer 186 having a structure similar to that shown in FIGS. 34 and 35.

Figure 38:
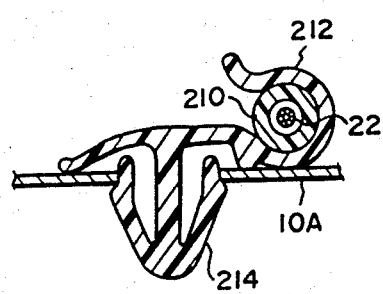
FIG. 38 is a sectional view taken along the line XXXVIII—XXXVIII of FIG. 7.

Each of the wire tubes 176 and 210 has a wire tube clamp 212 attached to its intermediate portion in the manner shown in FIG. 38. The wire tube clamps 212 clamp the respective outer peripheries of the wire tubes 170 and 210. Moreover, each of the wire tube clamps 212, for example, the one for the wire tube 210, has a retainer pawl 214 projecting from a portion thereof, the retainer pawl 214 being adapted to engage with the inner panel 10A so as to fix the wire tube 210 and prevent its oscillation.

Figure 39:
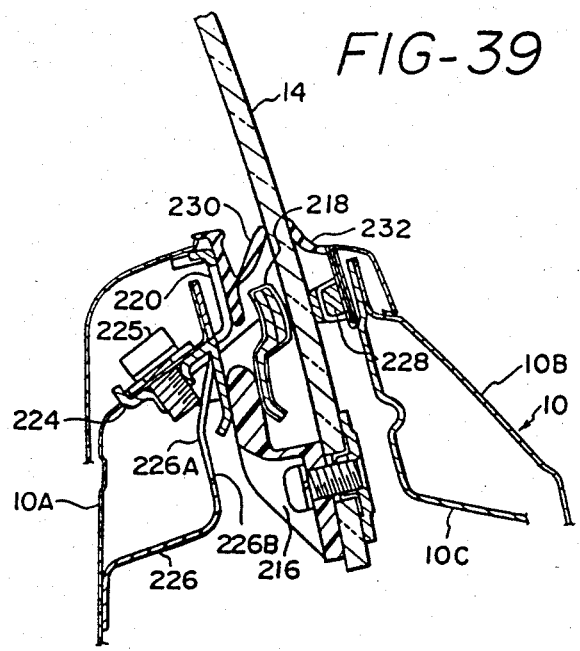
FIG. 39 is a sectional view taken along the line XXXIX—XXXIX of FIG. 1.

As shown in FIGS. 1 and 39, a pair of hooks 216 are firmly secured to a lower end portion of the window glass 14 by screws or other fastening means such as to be spaced from each other in the longitudinal direction of the vehicle. Each of the hooks 216 enters a space provided at the lower portion of an inner stabilizer 218 of a trim support 220 when the window glass 14 comes near its upper-limit position. Thus, when the window glass 14 is at its maximumly raised position, the movement thereof toward the inside of the compartment is limited at the belt line portion of the door 10. The trim support 220 is secured to a slot 224 provided at the upper end portion of the door inner panel 10A by means of a bolt 225 in such a manner that it is possible to adjust the position of the trim support 220 in the lateral direction of the vehicle.

In order to ensure the required rigidity of the belt line portion, a reinforcing panel 226 is welded to the upper end portion of the door inner panel 10A. The reinforcing panel 226 has a trim support mounting bore 226A and a recessed portion 226B at the portion thereof where the trim support 220 is mounted, the recessed portion 226B being curved toward the inside of the compartment for the purpose of ensuring a predetermined gap for allowing the hook 216 to be properly raised and lowered without hindrance. The outer panel 10B of the door 10 has a reinforcing panel 10C welded to its upper end portion.

An outer stabilizer 228 is mounted on the reinforcing panel 10C on the outer panel 10B of the door 10 such as to oppose the inner stabilizer 218. The outer stabilizer 218 limits the movement of the window glass 14 toward the outside of the compartment at the belt line portion of the door 10.

It is preferable to attach a felt material to the surface of each of the inner and outer stabilizers 218 and 228 and to coat the thus attached felt material with a flexible material. It is to be noted that the inner and outer stabilizers 218 and 228 are provided in pairs, each of the pairs corresponding to each of the pair of hooks 216 which are mounted on the window glass 14 in such a manner as to be spaced from each other in the longitudinal direction of the vehicle.

An inner weatherstrip 230 is disposed above the inner stabilizer 218, the inner weatherstrip 230 being provided on the trim which is supported by the trim support 220. Above the outer stabilizer 228 is disposed an outer weatherstrip 232 which is integrally formed with the belt lace which is firmly attached to the reinforcing panel 10C. The inner and outer weatherstrips 230 and 232 are disposed such as to extend over the substantially entire length of the belt line portion of the door 10. Thus, the inner and outer weatherstrips 230 and 232 respectively abut against the inner and outer surfaces of the window glass 14, thereby effecting sealing between the window glass 14 and the inner and outer panels 10A and 10B of the door 10. It is to be noted that the outer stabilizer 228 is firmly attached to the belt lace and is secured to the reinforcing panel 10C through the belt lace.

Figure 40:
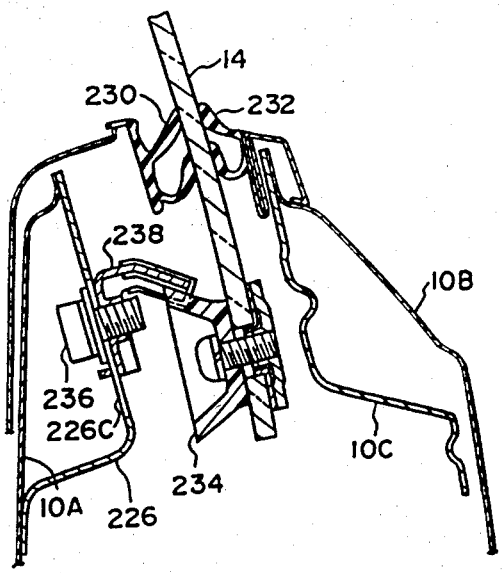
FIG. 40 is a sectional view taken along the line XL—XL of FIG. 1.

As shown in FIG. 1, up stops 234 are respectively disposed in front of the front hook 216 and at the rear of the rear hook 216 in terms of the longitudinal direction of the vehicle. The up stops 234 are secured to the window glass 14 by screws or other fastening means, as also shown in FIG. 40. Each of the up stops 234 has a conical shape and is adapted to abut against an up stop plate 238 when the window glass 14 is raised, the up stop plate 238 being firmly secured to the reinforcing panel 226 of the inner panel 10A by means of a bolt 236, whereby the up stops 234 limit the maximumly raised position of the window glass 14.

The reinforcing panel 226 has a mounting bore 226C employed to attach the up stop plate 238. The bore 226C is formed in the shape of a slot which is elongated in the vertical direction, thereby allowing the maximumly raised position of the window glass 14 to be adjusted.

Figure 41:
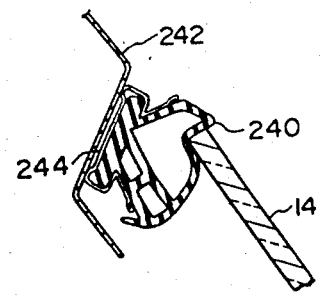
FIG. 41 is a sectional view taken along the line XLI—XLI of FIG. 1.

FIG. 41 shows the window glass 14 in the state wherein its upper end portion abuts against a roof weatherstrip 240. The roof weatherstrip 240 is mounted through a retainer 244 on a roof member 242 which is disposed at each of the sides of the vehicle such as to extend in the longitudinal direction thereof.

Figure 42:
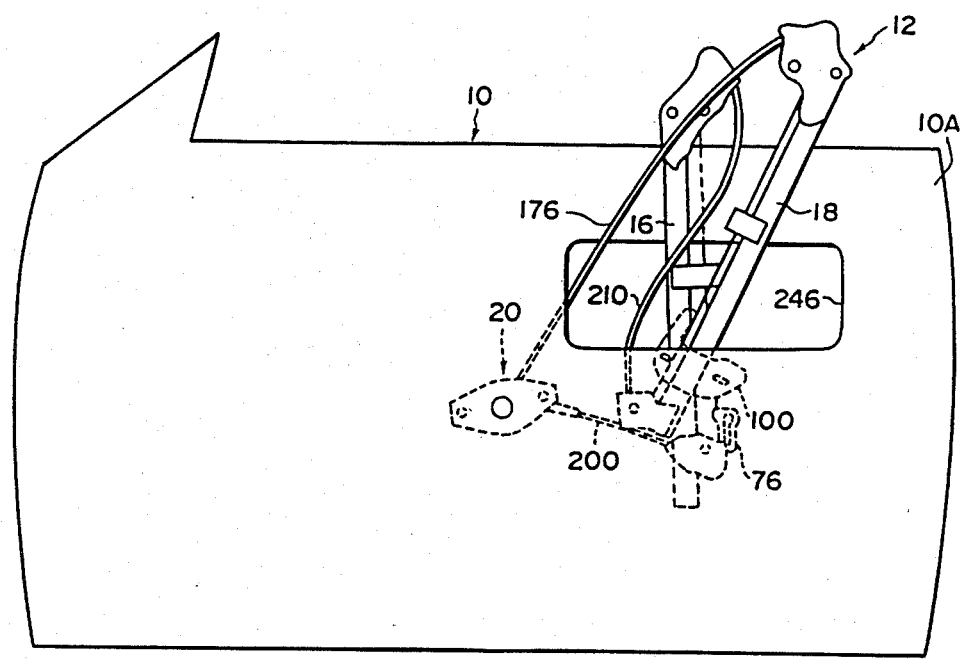
FIG. 42 shows the way in which the door window regulator is mounted in the door.

FIG. 42 shows the way in which the window regulator 12 according to the present invention, arranged as above, is mounted on the door 10. Since the window regulator 12 is produced as a subassembly in which the front and rear guide members 16, 18 and the driving unit 20 are interconnected by the wire tubes 176, 200 and 210, it is possible to carry the window regulator 12 as a unit. Moreover, since the wire tubes 176, 200 and 210 have flexibility, it is possible by virtue of this flexibility to reduce the volume or space occupied by the window regulator 12 by folding or placing the front and rear guide members 16, 18 and the driving unit 20 in such a manner that they come close to each other. Thus, it is possible to insert the window regulator 12, thus reduced in its size, into the door 10 from a relatively small insertion window 246 which is formed in the inner panel 10A in the manner shown in FIG. 42.

Figure 8:
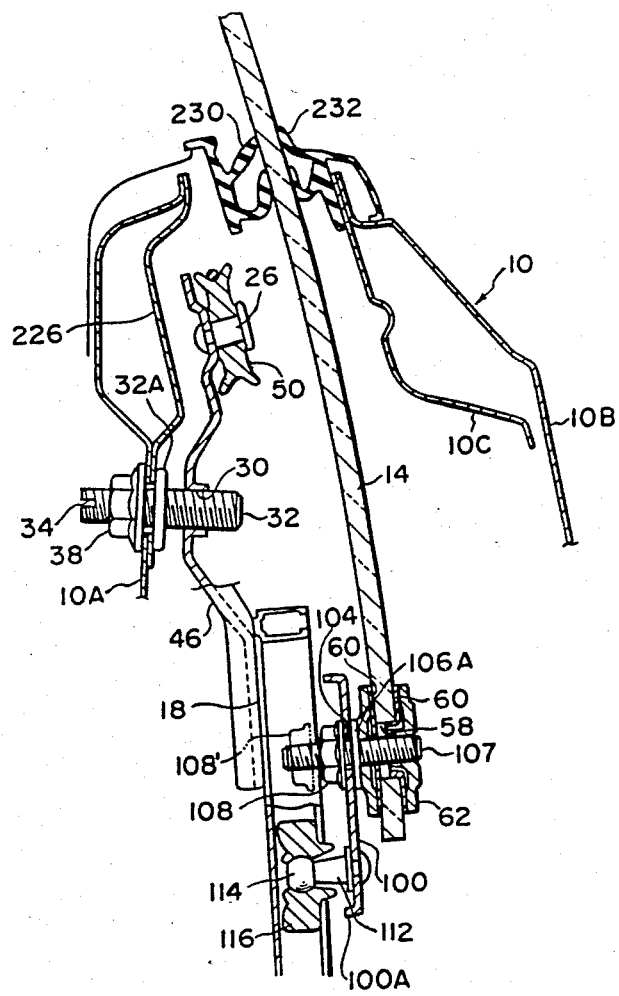
FIG. 8 is a sectional view taken along the line VIII—VIII of FIG. 7.

After the window regulator 12 has properly been inserted in the door 10, the respective upper end portions of the front and rear guide members 16 and 18 are secured to the inner panel 10A by the mounting bolts 32 as shown in FIGS. 3 and 8, while their respective lower end portions are secured to the inner panel 10A by the mounting bolts 44 as shown in FIGS. 6 and 9. In this case, it is possible for mounting position of the mounting bolt 32 shown in FIGS. 3 and 8 to be easily subjected to fine adjustment in the lateral direction of the vehicle by varying the degree to which the bolt 32 is screwed into the front or rear guide upper brackets 24 or 46 before the nut 38 is screwed onto the bolt 32. In consequence, it is possible to correct any possible error in terms of the relative position of the front and rear guide members 16 and 18 when they are mounted, or any possible positional error of these members 16 and 18 in relation to the door 10, and it is possible to effect fine adjustment of the abutting condition between the upper end portion of the window glass 14 and the roof weatherstrip 24 over the entire periphery of the abutting portion of the glass 14. Thus, it is possible to prevent leaking of rain and generation of noise which would occur in high-speed running of the vehicle as the result of draft blowing through any undesirable gap which might otherwise be present between the upper end portion of the window glass 14 and the roof weatherstrip 24. Further, it is also possible to attain smooth movement of the window glass 14 and to avoid wearing of the various portions.

The driving unit 20 is secured to the inner panel 10A by employing screws (not shown) which are respectively fitted into internal threads 142 formed in the driving unit 20.

In the above-described assembling operation, any slight error in terms of the relative position between the front and rear guide members 16, 18 and the driving unit 20 is advantageously absorbed by the wire 22 and the wire tubes 176, 200 and 210 by virtue of their flexibility.

It is preferable for the window regulator 12 in the subassembly state to have the front hook holder 76 and the rear glass bracket 100 respectively disposed close to the respective lower end portions of the front and rear guide members 16 and 18. By so doing, it becomes easy to mount the window glass 14 after the front and rear guide members 16 and 18 have been mounted on the door 10.

The window glass 14 is inserted into the door 10 from the upper side through the area between the inner and outer panels 10A and 10B. Then, the front slider 66 on the front glass bracket 54 which has previously been secured to the lower end portion of the window glass 14 is inserted into the groove in the front guide member 16, and the projection 82 of the front hook holder 76 is inserted into the slot 74. Further, the bolt 72 is passed through the circular bore 80 and slid to the slot 78.

At the rear glass bracket 100, on the other hand, the nut 108, which has been tentatively mounted on the head portion of the mounting bolt 107 secured to the window glass 14 beforehand, is passed through the circular bore 110 and then moved toward the slot 104, and the head portion of the mounting bolt 106 is inserted into the slot 102.

In consequence, the window glass 14 is tentatively fixed to the front and rear guide members 16 and 18 through the bolts 72 and the mounting bolts 106, 107, whereby the weight of the window glass 14 is properly supported. Accordingly, it is possible for the operator to easily secure the window glass 14 to the front hook holder 76 and the rear glass bracket 100 by tightening the mounting bolts 106, 107 and turning the bolts 72 and the nuts 108 relative to each other. Further, it is easy to adjust the relative position of the window glass 14 with respect to the front and rear guide members 16 and 18 within the plane along the surface of the window glass 14, so that it is possible to effect an accurate positioning operation. Thus, it is possible to ensure a smooth vertical movement of the window glass 14.

Since it is conventional practice to conduct positioning of the window glass 14 relative to the guide devices and effect fine adjustment of the relative position thereof while supporting the weight of the window glass 14 and to carry out the bolt tightening operation while doing so, it has heretofore been extremely difficult to mount the window glass 14.

The following is a description of the operation of the above-described window regulator 12.

As the door handle 153 is turned, the drum 148 is rotated, and the wire 22 is thereby moved in its longitudinal direction. For example, when the door handle 153 is turned clockwise as viewed in FIG. 1, the portion of the wire 22 within the wire tube 176 is wound up into the driving unit 20. Thereupon, the portions of the wire 22 which are respectively disposed substantially parallel to the front and rear guide members 16 and 18 are raised, and the window glass 14 is thereby moved in the direction in which the door window is closed. At this time, the portion of the wire 22 within the wire tube 200 is unwound from the driving unit 20.

Conversely, when the door handle 153 is turned counterclockwise, the window glass 14 is moved in the direction in which the door window is opened by the operation reverse to the above.

During the above-described movement of the wire 22, an appropriate tension is constantly applied to the wire 22 since the compression coil spring 206 serving as a tension application means is disposed between the wire tube 200 and the driving unit 20. Accordingly, it is possible for the wire 22 to reliably transmit the driving force derived from the driving unit 20.

Further, at the lower end portion of the window glass 14, the front and rear sliders 66 and 116 are reliably supported by the front and rear guide members 16 and 18, respectively, as shown in FIGS. 11 and 19, and at the belt line portion the movement of the window glass 14 toward the inside and outside of the compartment is limited by the inner and outer stabilizers 218 and 228 as shown in FIG. 39. There is therefore no risk of the window glass 14 having any play.

The position of the window glass 14 in the longitudinal direction of the vehicle is limited by the combination of the rear slider 116 and the rear guide member 18 as shown in FIG. 19. In this case, it is possible for the front slider 66 to move within the front guide member 16 in the longitudinal direction of the vehicle as shown in FIG. 11. Therefore, even if the front and rear guide members 16 and 18 are slightly offset and not disposed in parallel to each other as the result of variations in production thereof, it is possible to absorb such a small error in parallelism. Additionally, the window glass 14 is secured to the wire 22 at two positions, that is, the front and rear positions in terms of the longitudinal direction of the vehicle, through the front hook holder 76 and the rear glass bracket 100, and the wire 22 is connected at both its ends to the drum 148 such as to form a closed loop. Consequently, the vertical relative position of the front hook holder 76 and the rear glass bracket 100 is kept constant at all times, whereby the position of the window glass 14 in the direction of rotation thereof within the plane of the surface of the glass 14 is regulated. In order to obtain the rigidity required for this positional regulation, the front and rear guide members 16 and 18 are disposed in appropriate positional relation to each other.

Moreover, since the front guide member 16 is disposed in such a manner that its lower end portion crosses the wire 22, it is possible for the front guide member 16 to project to a substantial degree below the front lower pulley 42 as shown in FIG. 2. It is therefore possible for the front guide member 16 to guide the front slider 66 on the front glass bracket 54 to a correspondingly low position. In consequence, even when the window glass 14 is at its maximumly raised position, it is possible to obtain a favorably large vertical distance between the front slider 66 and the stabilizer 218 as shown in FIG. 1. Accordingly, it is possible to reliably support the window glass 14 while regulating its position when moving in the lateral direction of the vehicle and within the plane of the surface of the glass 14.

Figure 43:
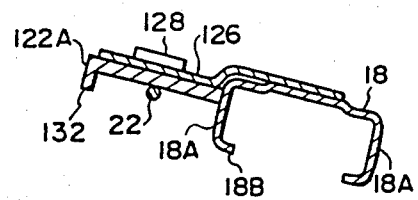
FIG. 43 is a sectional view corresponding to FIG. 23, which shows a second embodiment of the present invention.

Referring next to FIG. 43, there is shown a second embodiment of the present invention which includes a modification of the rear wire guide shoe 122 of the above-described embodiment. The rear wire guide shoe 122A in the second embodiment differs from the rear wire guide shoe 122 shown in FIG. 23 in that the stopper 132 on the rear wire guide shoe 122 on the side thereof which is closer to the rear guide member 18 is omitted in the rear wire guide shoe 122A, and one of the leg portions 18A of the rear guide member 18 practically serves as the stopper 132 employed in the first embodiment and omitted in this embodiment.

Figure 44:
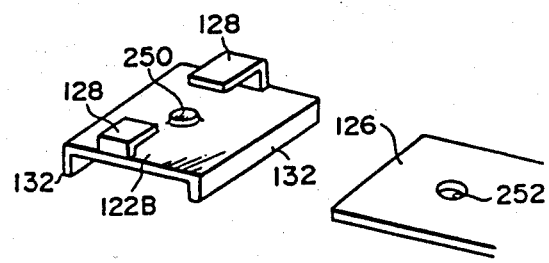
FIG. 44 is a sectional view corresponding to FIG. 25, which shows a third embodiment of the present invention.

FIG. 44 shows a third embodiment of the present invention which includes another modification of the rear wire guide shoe 122 of the first embodiment. In the rear wire guide shoe 122B in this embodiment, a tapered projection 250 is provided in the center of the rear wire guide shoe 122B in place of the rib 130 shown in FIG. 25. The tapered projection 250 is adapted to retain or clamp the rear shoe bracket 126 in cooperation with a pair of U-shaped grooves defined by the L-shaped holders 128. The rear shoe bracket 126 may be provided with a bore 252 in correspondence with the tapered projection 250, the bore 252 allowing a portion of the tapered projection 250 to enter it. Further, in place of the bore 252, it is possible to simply provide a recess which a portion of the tapered projection 250 enters.

It is to be noted that, although the above-described first embodiment exemplifies a structure in which the window regulator 12 according to the present invention is driven through the door handle 153, the invention may be applied to other types of window regulator, for example, one in which the rotational force is produced from the driving force derived from a motor or other similar means.

What is claimed is:

1. A door window regulator for vertically moving a door window glass of a vehicle, comprising:
   (a) upper and lower pulleys respectively disposed at the upper and lower portions of a door;
   (b) a wire having a portion thereof stretched between said upper and lower pulleys and connected to the lower portion of said door window glass at a portion of said wire between said upper and lower pulleys such that said wire forms a closed loop;
   (c) a driving unit adapted to actuate a portion of said closed loop wire, thereby applying actuating force to said door window glass by means of which it is raised and lowered; and
   (d) the axis of either one of said pulleys, said axis extending in the direction substantially orthogonal to the plane which includes the portion of said wire which extends from said pulley to said driving unit and is directed toward the inside of the compartment of said vehicle, whereby it is possible for said wire to be smoothly passed over said pulley, and the friction occurring between said wire and the side surface of the pulley groove is thereby reduced.

2. A door window regulator according to claim 1, wherein said pulleys are rotatably supported at the respective upper and lower portions of a guide member which is provided inside said door and adapted to guide the vertical movement of said window glass.

3. A door window regulator according to claim 2, wherein said pulleys are rotatably supported on a bracket which is secured to said guide member.

4. A door window regulator according to claim 2, wherein said guide member is provided with a guide groove adapted for vertically guiding a slider which is secured to said window glass.

5. A door window regulator according to claim 4, wherein there are a pair of said guide members which are provided inside said door in parallel and at respective positions spaced from each other in the longitudinal direction of said vehicle.

6. A door window regulator according to claim 5, wherein said wire is guided to said driving unit from the upper pulley on the rear guide member in terms of the longitudinal direction of said vehicle.

7. A door window regulator according to claim 6, wherein said wire is guided from the lower pulley on the rear guide member to the upper pulley on the front guide member and from the lower pulley on the front guide member to said driving unit which is disposed in front of said front guide member in terms of the longitudinal direction of said vehicle.

8. A door window regulator according to claim 7, wherein the axis of either one of said upper and lower pulleys extends in the direction orthogonal to the plane which passes through a position intermediate between the position of the portion of said wire which extends from said pulley to the other pulley at the time when said glass is maximumly raised and the position of said wire portion at the time when said glass is maximumly lowered.

9. A door window regulator according to claim 8, wherein said plane which passes through said intermediate position includes the line which halves the angle made between the position of said wire at the time when said glass is maximumly raised and the position of said wire at the time when said glass is maximumly lowered.

10. A door window regulator for guiding the vertical movement of a door window glass of a vehicle, comprising:
   (a) upper and lower pulleys;
   (b) a wire for transmitting driving force, said wire having a portion thereof stretched between said upper and lower pulleys and being connected to the lower portion of said door window glass at a portion of said wire between said upper and lower pulleys;
   (c) a driving unit adapted to actuate a portion of said wire, thereby applying actuating force to said window glass by means of which it is raised and lowered; and
   (d) the axis of rotation of either one of said pulleys, said axis of rotation extending in the direction orthogonal to the plane which passes through a position intermediate between the position of the portion of said wire which extends from one of said pulleys to the connection at the lower portion of said window glass at the time when said glass is maximumly raised and the position of said wire portion at the time when said glass is maximumly lowered, whereby the degree to which said wire passed over said pulley is offset from its normal position is reduced to thereby guide said wire smoothly and decrease the amount of friction occurring between said wire and said pulley.

11. A door window regulator according to claim 10, wherein said plane which passes through said intermediate position includes the line which halves the angle made between the position of said wire at the time when said glass is maximumly raised and the position of said wire at the time when said glass is maximumly lowered.

12. A door window regulator according to claim 11, wherein said pulleys are rotatably supported at the respective upper and lower portions of a guide member which is provided inside said door and adapted to guide the vertical movement of said window glass.

13. A door window regulator according to claim 12, wherein said guide member is provided with a guide groove adapted for vertically guiding a slider which is secured to said window glass.

14. A door window regulator according to claim 13, wherein there are a pair of said guide members which are provided inside said door in parallel and at respective positions spaced from each other in the longitudinal direction of said vehicle.

15. A door window regulator according to claim 14, wherein said wire is guided from said driving unit to the upper pulley on the rear guide member in terms of the longitudinal direction of said vehicle, from the lower pulley on the rear guide member to the upper pulley on the front guide member and from the lower pulley on the front guide member to said driving unit which is disposed in front of said front guide member in terms of the longitudinal direction of said vehicle.

16. A door window regulator according to claim 15, wherein each of said guide members is curved in harmony with the curvature of said window glass.

17. A door window regulator for guiding the vertical movement of a door window glass of a vehicle, comprising:
   (a) parallel guide members mounted inside a door in such a manner that the respective axes of said guide members extend vertically;
   (b) a shoe secured to the lower portion of said door window glass and vertically guided by each of said guide members;
   (c) upper and lower pulleys rotatably supported at the respective upper and lower portions of each of said guide members;
   (d) a wire having a portion thereof stretched between said upper and lower pulleys on each of said guide members such as to be disposed along said guide members, said wire being connected to said window glass at a portion of said wire between said upper and lower pulleys on each of said guide members; and
   (e) the axis of either one of said pulleys, said axis extending in the direction substantially orthogonal to the plane which includes the portion of said wire which extends from said pulley to a driving unit and is directed toward the inside of the compartment of said vehicle, and said axis also extending in the direction orthogonal to the plane which passes through a position intermediate between the position of the portion of said wire which extends from said pulley to the connection at the lower portion of said window glass at the time when said glass is maximumly raised and the position of said wire portion at the time when said glass is maximumly lowered.

18. A door window regulator according to claim 17, wherein each of said guide members is provided with a guide groove adapted for vertically guiding a slider which is secured to said window glass.

19. A door window regulator according to claim 18, wherein said wire is guided to said driving unit from the upper pulley on the rear guide member in terms of the longitudinal direction of said vehicle.

20. A door window regulator according to claim 19, wherein said wire is guided from the lower pulley on the rear guide member to the upper pulley on the front guide member and from the lower pulley on the front guide member to said driving unit which is disposed in front of said front guide member in terms of the longitudinal direction of said vehicle.

* * * * *